United States Patent [19]
Ladouceur

[11] 3,810,291
[45] May 14, 1974

[54] INSTALLATION DIE AND NUT AND METHOD OF INSTALLING A NUT IN A PANEL

[75] Inventor: Harold A. Ladouceur, Livonia, Mich.

[73] Assignee: Multifastener Corporation, Detroit, Mich.

[22] Filed: Apr. 3, 1972

[21] Appl. No.: 240,704

Related U.S. Application Data

[63] Continuation-in-part of Ser. No. 90,923, Nov. 11, 1970, Pat. No. 3,724,520, which is a continuation-in-part of Ser. No. 841,037, July 11, 1969, abandoned.

[52] U.S. Cl............... 29/243.52, 29/432, 151/41.73
[51] Int. Cl.............................................. B23p 11/00
[58] Field of Search............ 29/243.5, 243.52, 432, 29/432.1, 432.2, 506, 509, 522, 523; 85/32 K; 151/41.72, 41.73; 285/202

[56] References Cited
UNITED STATES PATENTS

| | | | |
|---|---|---|---|
| 2,018,683 | 10/1935 | Meyer | 29/432 |
| 3,253,631 | 5/1966 | Reusser | 151/41.73 |
| 3,213,914 | 10/1965 | Baumle | 151/41.73 |
| 3,282,315 | 11/1966 | Zanodiarin | 151/41.73 |
| 1,554,764 | 9/1925 | Schwartz | 85/32 K |
| 3,469,613 | 9/1969 | Steward | 151/41.73 |

Primary Examiner—James L. Jones, Jr.
Assistant Examiner—Mark S. Bicks

[57] ABSTRACT

This disclosure relates to the combination of a die and nut for installing a nut in a panel and a method of installing a nut in a panel.

In the disclosed embodiment of the apparatus, the piercing end of the die member is circular or annular and fits snugly into the tool receiving recess of the nut groove. In the preferred embodiment, pressure relief is provided in the nut by making the outer wall defining the tool receiving recess, or junction between the bottom walls, hexagonal or polygonal, whereby entrapped metal is extruded into the corners. The outer wall of the groove and the outer wall of the flange portion are also preferably concentric polygons with parallel sides. The die member includes an enlarged hexagonal or polygonal portion which deforms the pierced edges of the panel against the polygonal outer inclined wall of the groove.

10 Claims, 5 Drawing Figures

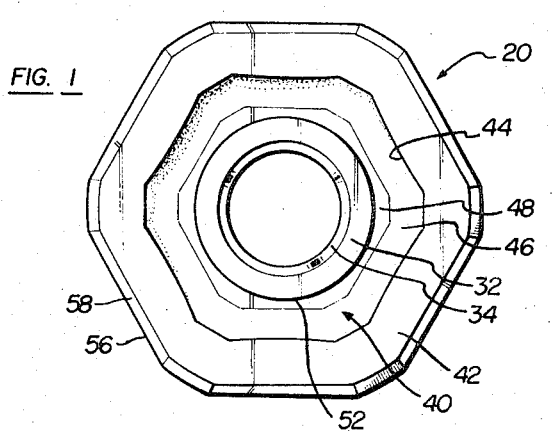
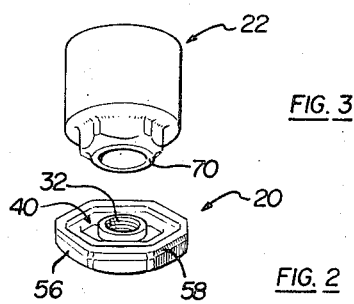
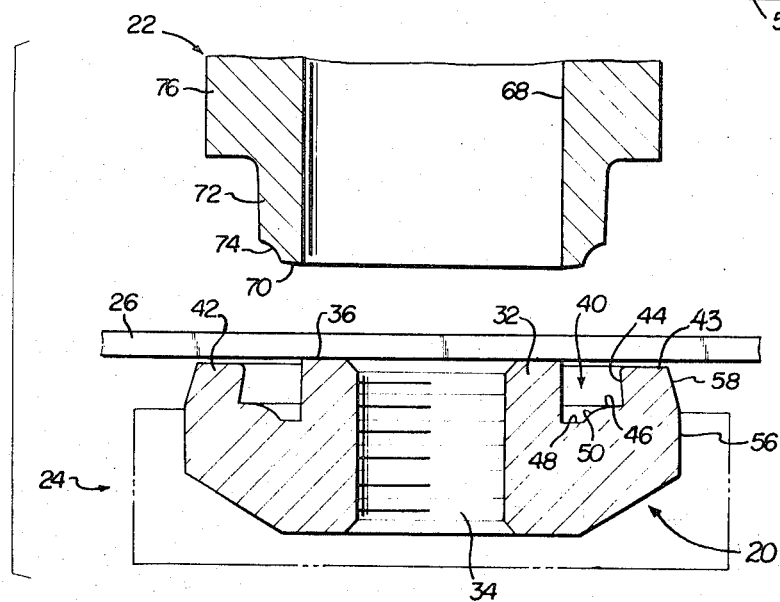
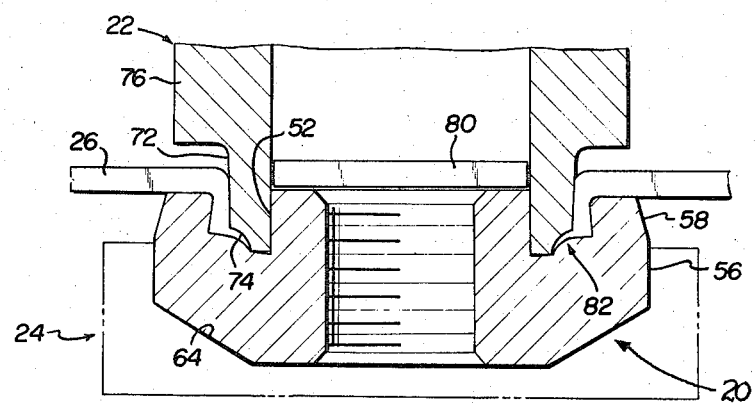

INSTALLATION DIE AND NUT AND METHOD OF INSTALLING A NUT IN A PANEL

FIELD OF THE INVENTION

This application discloses an improved self-piercing nut, method and apparatus and is a continuation-in-part of my copending application for United States patent, Ser. No. 90,923, filed Nov. 11, 1970, now U.S. Pat. No. 3,724,520 which is a continuation-in-part application of my abandoned application, Ser. No. 841,037, filed July 11, 1969. A suitable apparatus and method of making the disclosed self-piercing nut is also disclosed in my copending application for patent, Ser. No. 149,518, filed June 3, 1971.

This application relates to the combination of a nut, preferably a self-piercing nut, and a die, wherein the nut pierces its own hole in a panel and is simultaneously installed in the panel. The apparatus may form part of a larger assembly, such as a press assembly, wherein the die is secured within the press and a self-piercing fastener or nut is installed in the panel with each stroke of the press. The advantages of this system are set forth more fully in my abve referenced copending applications for United States patent.

SUMMARY OF THE INVENTION

The improved self-piercing fastener of this invention is adapted to be secured to a sheet metal panel, or the like, in a press assembly or other apparatus which causes the nut to pierce a hole in the panel and secure the nut within the panel opening. The nut includes a central threaded aperture which permits securement of a male threaded member to the panel. A pilot portion surrounds the threaded opening and includes a flat pilot face generally perpendicular to the axis of the threaded aperture, a configured groove encircles the pilot portion and receives the pierced edge of the panel to secure the nut to the panel and a flange portion surrounds the groove. This structure is more fully described in my above referenced copending application for United States patent.

The groove which encircles the pilot portion includes an outer wall radially spaced from the pilot portion, a first bottom wall at the outer wall, an inner wall at the pilot portion and a second bottom wall at the inner wall. The second bottom wall is spaced farther from the plane of the piercing or pilot face of the pilot portion to define a tool receiving recess, as described in my copending application for United States patent.

The shape or configuration of the walls of the groove and the nut body are particularly important to the disclosed embodiment of the self-piercing fastener because of the close tolerances required to retain the nut on the panel and the importance of economizing metal in nut production of the type disclosed. The nut must meet various pullout and other structural requirements, however it is equally important not to over-design the nut for practical reasons. Further, extreme pressures are generated in deforming the pierced panel edge into the groove opening and entrapping the metal to secure the nut on the panel. These pressures can be sufficient to cause cracks or fissures in the panel or breaking of the nut if the nut is not properly designed or relief areas provided to avoid extreme pressure build-up.

In the preferred embodiment of the disclosed self-piercing nut, the junction between the first and second bottom walls of the groove define a regular polygon which provides relief areas for the piercing end of the die at the corners. The outer wall of the groove may also define a regular polygon for the reasons given hereinbelow and the exterior surface of the nut body may also define a regular polygon. The disclosed embodiment of the nut thereby includes three concentric polygonal faces or walls which are preferably the same geometric shape, having parallel side walls. In the disclosed embodiment, the regular polygon is a hexagon.

The nut is secured to a panel by supporting the panel which is to receive the nut between a punch retaining the nut and a die member. The die member includes a central opening which telescopically receives the pilot portion of the nut to pierce out a panel slug through the opening in the die member. The die member also includes an annular piercing end which is received in the tool receiving recess in the nut to fold the pierced edge of the panel into the nut groove and an enlarged die portion which deforms the pierced end of the panel against the outer wall of the groove and the first bottom wall.

In the preferred embodiment of the apparatus, the piercing end of the die member is cylindrical and is received within the tool receiving recess, between the inner wall of the groove and the junction between the bottom walls, which is polygonal. The annular piercing end of the die preferably snugly fits within the tool receiving recess to confine the panel between the die and the outer wall and therefore the polygonal juncture between the bottom walls provides a plurality of pressure relief areas, about the periphery, which receives any metal entrapped within the tool receiving recess. Similarly, the polygonal enlarged die portion of the die member deforms the metal outwardly, generally perpendicular to the polygonal surfaces of the outer wall of the groove.

Other advantages, and meritorious features of the disclosed method, apparatus and self-piercing nut will be more fully described in the following Description of the Preferred Embodiments, the Drawings and the Claims.

BRIEF DESCRIPTION OF THE DRAWINGS

FIG. 1 is a top elevation of one embodiment of the self-piercing nut of this invention.

FIG. 2 is a top, perspective view of the self-piercing nut shown in FIG. 1;

FIG. 3 is an end perspective view of the die member utilized in the apparatus of this invention;

FIG. 4 is a side cross sectional view of the apparatus of this invention, prior to securement of the self-piercing nut; and FIG. 5 is a side cross sectional view, as shown in FIG. 4, with the nut secured to a panel.

DESCRIPTION OF THE PREFERRED EMBODIMENTS

The self-piercing fastener or nut and apparatus of this invention is particularly adapted to permanently secure a nut to a sheet metal panel, or the like, in overlying relation. The apparatus is particularly adapted to operation in a conventional press or the like where the metal panel is being formed. The nuts may then be secured to the panel with each stroke of the press. The disclosed invention includes a nut 20 which may be utilized to pierce the panel, a die member 22, which clinches the panel on the nut, and a punch 24 which supports the nut for securement to the panel. In the disclosed embodiment of the invention, the sheet metal panel 26 may be supported with the nut and punch in a press, or the like, for movement relative to the die member 22. The self-piercing nuts are fed to the punch through a conventional feed system, or the like.

The disclosed embodiment of the self-piercing nut 20 includes a generally cylindrical pilot portion 32 having a threaded aperture 34. The pilot portion includes a flat pilot or piercing face 36 which receives the panel 26 thereagainst, as shown in FIG. 4. The pilot portion is surrounded by a configured groove 40 and a flange portion 42. The flange portion includes an end face 43 generally parallel to the plane of the piercing face 36. In the preferred embodiment, the end face 43 is parallel to or below the level of the piercing face 36 to facilitate piercing of the panel, as described hereinbelow.

The groove 40 is adapted to receive and retain the pierced edge of the panel 26, as described in my above referenced copending application for patent. In the disclosed embodiment, the groove includes an outer wall 44 which is tapered inwardly to overlie the first bottom wall 46 of the groove, as shown in FIGS. 4 and 5. The second bottom wall 48 is preferably spaced farther from the plane of the piercing face 36 than the first bottom wall to define a tool receiving recess, as shown in FIG. 5. The junction 50 of the first and second bottom walls is preferably arcuate for the reasons hereinbelow. The inner wall 52 of the pilot portion is preferably cylindrical to receive the cylindrical opening in the die member.

As described above, the configuration of the nut and the nut groove is particularly important to the apparatus and method of this invention. The outer wall 56 of the nut body is preferably polygonal to locate the nut relative to the die member and to aid in the feeding of the nut to the punch member 24. In the disclosed embodiment, the exterior of the nut 56 is hexagonal, as shown in FIGS. 1 and 2. The nut also includes a tapered hexagonal surface 58 which results from the forming of the inclined outer wall 44 of the groove, as described in the above referenced copending application for United States patent. The nut is received in a configured opening 64 in the punch, which is also preferably hexagonal to locate the nut relative to the punch, as shown in FIGS. 4 and 5.

The disclosed embodiment of the die member 22 includes a circular opening 68 which telescopically receives the cylindrical wall 52, as shown in FIGS. 4 and 5. The piercing end 70 of the die member in the disclosed embodiment is annular, as shown in FIG. 3, to provide a cylindrical piercing end which is snugly received within the tool receiving recess of the nut groove, as shown in FIG. 5. The die member also includes an enlarged die portion 72 which is joined to the piercing end 70 by an arcuate portion 74. The body portion of the die is shown at 76.

The preferred configuration of the nut groove includes a polygonal outer wall 44 and the enlarged die portion 72 is also preferably polygonal to provide parallel opposed panel forming surfaces. The junction 50 of the bottom walls of the groove is preferably polygonal to provide pressure relief areas, as described above. The resultant nut configuration includes a cylindrical inner wall 52 surrounded by concentric polygonal walls or surfaces 50, 44, 58 and 56. To simplify the manufacture of the nut and to aid in locating these surfaces or walls in the assembly, the polygonal surfaces are preferably the same geometric shape, with the sides being parallel. In the disclosed embodiment, the surfaces are hexagonal, however other regular polygonal shapes may also be utilized.

In the method of securing the self-piercing nut of this invention, the nuts 20 are fed to the configured opening 64 in the punch 24 to locate the nut relative to the die member 22. The panel 26 is supported between the punch 24 and the die 22, as shown in FIG. 4 and the punch and panel are moved relative to the die as shown in FIG. 5. It is understood that the die member may be moved toward the panel or the panel and punch may be moved toward the die.

After the panel 26 has been contacted by the die 22, continued relative movement pierces a slug 80 from the panel, as shown in FIG. 5. The panel is sheared between the piercing face 36 of the nut and the piercing end 70 of the die member to telescopically receive the cylindrical inner wall 52 of the groove in the opening 68 of the die. The pierced edge 82 of the panel is then deformed beneath the arcuate surface 74 of the die member to engage the radial outer wall 44 of the groove and the first groove bottom wall 46. Continued movement of the die member, relative to the self-piercing nut 20, disposes the annular piercing end 70 of the die in the tool receiving recess, as shown in FIG. 5, against or adjacent the second bottom wall 48 of the groove. The arcuate surface 74 and the enlarged die portion 72 deform the pierced edge of the panel beneath the inclined outer wall 44 to lock the panel in the groove, as shown in FIG. 5.

The annular piercing end 70 of the die is preferably snugly received in the tool receiving recess of the groove to confine the pierced edge 82 of the panel between the die and the inclined outer wall 44, as shown in FIG. 5. In the event that metal is entrapped within the tool receiving recess, beneath the annular end 70 of the die, the pressure generated may be sufficient to damage or break the die. This pressure is relieved by making the junction 50 between the bottom walls 46 and 48 of the groove hexagonal or polygonal to provide pressure relief areas at the corners. That is, the exterior surface of the piercing end 70 of the die member is cylindrical and is received within a hexagonal or polygonal opening to provide pressure relief areas.

The configuration of the nut and die member is therefore particularly important to the apparatus and method of attaching a self-piercing nut to a panel. It will be noted that other geometric shapes may be utilized for the hexagonal walls and surfaces of the disclosed nut and die member, however the preferred shape is a regular polygon, such as a hexagon or octagon. Further, the corners of the polygons are preferably truncated, as shown in FIG. 1, to eliminate sharp corners which may cause breaking at the corners of the pierced panel.

The method of securing a nut to a metal panel, therefore, includes supporting the panel 26 between a punch 24 and a die member 22, as shown in FIG. 4. The nut 20 is fed to the configured recess 64 in the punch 24, opposite the panel, which orients and aligns the nut relative to the die member 22. The panel is then pierced by moving the nut and panel relative to the die member 20, which shears the panel between the flat piercing face 36 and the piercing ends 70 of the die member. The pierced slug 80 is ejected through the opening 68 in the die member. The relative movement between the nut and die member is continued to receive the cylindrical pilot portion 32 in the opening 68 in the die member and the piercing end 70 of the die member in the tool receiving recess opposite the second bottom wall 48 of the groove. In the event that metal is entrapped within the tool receiving recess, the pressure of deformation is relieved by providing spaced relief areas about the periphery of the tool receiving recess, which permits the metal to flow into these relief areas. The relief areas in the disclosed embodiment are provided by the hexagonal junction 50 between the first and second bottom walls.

I claim:

1. The combination of a die member and a self-piercing nut for piercing a hole in a panel having a predetermined thickness and secure the nut within the pierced hole, comprising: said nut having a central threaded aperture, a pilot portion having a flat piercing face generally perpendicular to the axis of said aperture and adapted to be received against the panel to be pierced, a flange portion surrounding said pilot portion and having an end face generally parallel to the plane of said piercing face and a continuous groove surrounding said pilot portion between said pilot portion and said flange portion, said groove adapted to receive the pierced edge of the panel to secure the nut to the panel, said groove having an outer wall at said flange portion, a first bottom wall at said outer wall adapted to receive the pierced edge of the panel, an inner wall at the pilot portion and a second bottom wall at said inner wall adapted to receive the piercing end of the die member, said second bottom wall of the groove spaced farther from the plane of said piercing face than said first bottom wall to define a tool receiving recess adjacent said pilot portion, said die member having a central opening telescopically receiving said inner wall of said nut groove to pierce a hole in a panel received between said nut and said die member, a circular piercing end telescopically receivable within said tool receiving recess of said nut groove to fold the pierced edge of the panel into said groove, and a radially enlarged portion spaced from said piercing end of the die member a distance less than the depth of said groove, said enlarged portion adapted to force the pierced edge of the panel outwardly against said outer wall of the nut groove and said first bottom wall and confine said panel in said groove, the junction of said first and second bottom walls of the nut groove defining a regular polygon concentric with said pilot portion to define relief areas at the corners of said polygon to receive the deformed panel edge.

2. The die and nut defined in claim 1, characterized in that said outer wall of the nut groove defines a second regular polygon concentric with said threaded aperture and said enlarged portion of the die member also defining said second regular polygon having a smaller diameter to force the pierced edge of the panel against said groove outer wall.

3. The die and nut defined in claim 2, characterized in that said outer wall of the groove is inclined to overlie said first bottom wall to entrap the pierced edge of the panel therebeneath.

4. The die and nut defined in claim 2, characterized in that said regular polygon and said second regular polygon are the same geometric shape.

5. The die and nut defined in claim 4, characterized in that said geometric shape is a hexagon.

6. The die and nut defined in claim 2, characterized in that the external surface of said flange portion also defines said geometric shape to locate the nut relative to the die member, prior to piercing.

7. The die and nut defined in claim 1, characterized in that said piercing face of the nut is spaced from said bottom walls of the groove a distance equal to or greater than the distance said end face is spaced from said bottom walls.

8. The die and nut defined in claim 1, characterized in that said central opening of the die member and said inner wall of the groove are cylindrical.

9. The combination of a die and a nut, comprising: said nut having a central threaded bore extending through one end face of the nut and a channel encircling said bore in said nut end face defining a flange portion encircling said nut channel, said nut channel having a radial outer side wall adjacent said flange portion and a configured bottom wall, said channel bottom wall including a first wall at said radial outer side wall adapted to receive the pierced edge of the panel, a second wall adjacent said threaded bore adapted to receive said die member and a regular polygonal medial wall concentric with said nut bore and joining said first and second bottom walls, said second bottom wall spaced farther from said nut end face than said first end wall to provide a die receiving recess adjacent said nut bore, said die member having a projecting circular end telescopically receivable within said tool receiving recess of said nut channel to fold the pierced edge of the panel into said nut channel and a radially enlarged portion spaced from said cylindrical end a distance less than the depth of said channel, said enlarged portion adapted to force the pierced edge of the panel outwardly against said outer side wall of the channel and said first bottom wall and confine said panel edge in said channel, the corners of said regular polygonal medial wall defining pressure relief areas during installation of the nut in the panel.

10. The combination of a die and nut defined in claim 9 characterized in that said radial outer side wall defines a regular polygon concentric with said medial wall and said outer wall is inclined toward said nut bore to overly said first bottom wall and entrap the pierced edge of the panel therebeneath.

* * * * *